(12) United States Patent
Alonso et al.

(10) Patent No.: US 7,161,935 B2
(45) Date of Patent: Jan. 9, 2007

(54) NETWORK FABRIC MANAGEMENT VIA ADJUNCT PROCESSOR INTER-FABRIC SERVICE LINK

(75) Inventors: Carlos Alonso, Los Gatos, CA (US); Richard L. Hammons, Hollister, CA (US)

(73) Assignee: Brocade Communications Stystems, Inc., San Jose, CA (US)

( * ) Notice: Subject to any disclaimer, the term of this patent is extended or adjusted under 35 U.S.C. 154(b) by 980 days.

(21) Appl. No.: 10/062,977

(22) Filed: Jan. 31, 2002

(65) Prior Publication Data

US 2003/0142628 A1 Jul. 31, 2003

(51) Int. Cl.
*H04L 12/50* (2006.01)

(52) U.S. Cl. .................. 370/384; 370/522

(58) Field of Classification Search .............. None
See application file for complete search history.

(56) References Cited

U.S. PATENT DOCUMENTS

| | | | | |
|---|---|---|---|---|
| 5,651,006 | A | 7/1997 | Fujino et al. | 370/408 |
| 5,805,924 | A | 9/1998 | Stoevhase | 395/831 |
| 6,529,963 | B1 * | 3/2003 | Fredin et al. | 710/1 |
| 6,711,171 | B1 * | 3/2004 | Dobbins et al. | 370/400 |
| 6,775,230 | B1 * | 8/2004 | Watanabe et al. | 370/228 |
| 6,940,810 | B1 * | 9/2005 | Roa-Diaz | 370/217 |
| 6,944,152 | B1 * | 9/2005 | Heil | 370/360 |
| 6,993,593 | B1 * | 1/2006 | Iwata | 709/238 |
| 2002/0194407 | A1 * | 12/2002 | Kim | 710/104 |
| 2003/0074473 | A1 * | 4/2003 | Pham et al. | 709/246 |
| 2003/0172239 | A1 * | 9/2003 | Swank | 711/163 |
| 2004/0260875 | A1 * | 12/2004 | Murotani et al. | 711/114 |

OTHER PUBLICATIONS

Fibre Channel Methodologies for Interconnects (FC-MI) Rev 1.8; Sep. 28, 2001; Secretariat: Information Technology Industry Council.

(Continued)

*Primary Examiner*—Chau Nguyen
*Assistant Examiner*—Anthony Sol
(74) *Attorney, Agent, or Firm*—Wong, Cabello, Lutsch, Rutherford & Brucculeri, LLP

(57) ABSTRACT

An adjunct processor controls an inter-fabric service link (IFSL) coupled to at least two independent SAN switching networks. The inter-fabric service link is coupled between multiple switching fabrics to allow the attached switching fabrics to be logically managed as a single entity while still being physically independent of each other. The IFSL does not transmit nor receive data being transmitted from a storage device to a host; rather, only management data is transmitted along the IFSL. The IFSL includes an inter-fabric adjunct processor, and a plurality of connections to the attached switching fabrics on which the IFSL communicates with IFSL agents operating on various switching elements within the attached switching fabrics. IFSL agents generate management data corresponding to the particular switching element on which the agent operates. This management data is intermittently transmitted to the IFSL for processing. Upon receipt of this management data, the IFSL updates a fabric map containing the corresponding switching element according to the received management data. As a result, the IFSL has a current snapshot of the status and functionability of each of the switching elements within the attached switching fabrics. Additionally, the IFSL may respond to the received management data by transmitting operation requests to a switching element.

24 Claims, 9 Drawing Sheets

OTHER PUBLICATIONS

Fibre Channel Generic Services (FC-GS) Rev 3.1; Aug. 7, 1996; Secretariat: Computer & Business Equipment Manufacturers Association.

Fibre Channel—Generic Services—2 (FCGS-2); American National Standards Institute; Oct. 14, 1999.

Fibre Channel—Generic Services—3 (FC-GS-3); American National Standards Institute; Jul. 31, 2001; pp. Start to 8 and 93-160.

Fibre Channel—Generic Services—4 (FC-GS-4); Secretariat: Information Technology Industry Counsel; Sep. 19, 2001; pp. Start to 8 and 95-171.

Fibre Channel—Switch Fabric (FC-SW); Secretariat: Information Technology Industry Council; Oct. 21, 1997.

Fibre Channel—Switch Fabric—2 (FC-SW-2); Secretariat: Information Technology Industry Council; Jun. 26, 2001; pp. Start to 10 and 33-94.

* cited by examiner

NETWORK FABRIC MANAGEMENT VIA ADJUNCT PROCESSOR INTER-FABRIC SERVICE LINK

BACKGROUND

1. Field of the Invention

The present invention relates to storage area networks fabric virtualization using an adjunct processor. More particularly, the present invention relates to virtualization of multi-fabric storage area networks (SANs) using an adjunct processor. Still more particularly, the present invention relates to an adjunct processor that manages a multi-fabric SAN as a single fabric network.

2. Description of the Background Art

The importance of storage area networks (SANs) in today's networking environment is well known. Typically, a SAN is a back-end network coupling multiple storage devices together using channels such as Fibre Channel, SCSI, iSCSI (SCSI over IP), or Infiniband. SANs provide service providers a large amount of storage capacity that may be efficiently retrieved by a host or application server. Additionally, and perhaps more importantly, SANs have allowed service providers and the information technology industry to grow their storage and server needs independently of each other. Specifically, SANs allow storage capacity to be increased without having to purchase additional servers.

The ability to store large amounts of data and quickly retrieve data from SANs has become even more relevant as the use of application servers in the enterprise has increased. The application servers perform operations on very large amounts of data, with only small data sets being provided to a client terminal on a network. For example, the Internet Data Center, supporting E-commerce applications requires a very large amount of data to be processed by the application servers, but only small pages are sent to the client browser. In order to accommodate the storage of these large files, SANs typically comprise multiple storage devices that operate together as a group. For example, a redundant array of independent disks allows multiple storage disks to store and retrieve data in parallel by using a striping method. These storage clusters generally provide a high level of fault tolerance and redundancy.

SANs may be implemented in either a centralized or decentralized configuration. A centralized configuration directly couples multiple hosts to a single switching element (or director) connected to the storage cluster. As described above, this storage cluster comprises multiple storage devices. This centralized configuration requires a switching element that has a high port density, requires no single point of failure, and the result is a high cost switching element.

A decentralized or network model SAN configuration couples multiple hosts to multiple interconnected switches and/or fabrics to multiple storage clusters. Typically, a switching fabric is used to route data from a particular storage cluster to a particular host. This configuration allows a service provider to distribute storage devices within a SAN. Additionally, this decentralized configuration provides an additional level of scalability to a corresponding SAN. The switching fabric provides a variety of paths between a storage device and a host. These multiple paths provide an additional level of redundancy to the SAN. The decentralized SAN also provides a mechanism to provide even higher number of ports (across multiple switches) at a lower cost.

As the storage clusters are added to a SAN, each cluster can either be plugged into an existing fabric or a new fabric can be created depending on the specific application of the new storage. As a result, a large number of decentralized SANs contain multiple switching fabrics. The use of multiple switching fabrics within a SAN offers a variety of advantages over SANs having a single switching fabric. For example, an additional level of redundancy is added to the network by allowing data to routed around a failed switch. This additional level of redundancy provides for high availability operation (i.e. no single failure will completely block the hosts from communicating with each other or with a particular storage cluster).

A decentralized SAN may comprise a single fabric or multiple redundant fabrics. In either configuration, redundant paths exist between a server and a particular storage device. If multiple redundant fabrics exist, then the SAN is provided a layer of protection against overall failure in the case where a single fabric (or element within the fabric) goes down. Generally, each of these switching fabrics is separated from other switching fabrics within a decentralized SAN. The separation provides the isolation required for high availability operation within the SAN that is described above. However, the isolation of switching fabrics within a SAN creates a network management problem.

Each SAN switching fabric must operate its fabric services independently while simultaneously attempting to function within a single switching entity. In other words, the hosts connected to each fabric have to duplicate their management operations to each of these fabrics. As a result, the lack of cooperation between each switching fabric leads to a cumbersome operating model as well as uses unnecessary bandwidth due to these duplicative management operations. For example, management data from a host relating to security must be relayed to each attached switching fabric in order to protect the switch. This duplicative operation requires both bandwidth and processing time to complete.

Independent switching fabrics may also limit a switch's ability to balance various loads across multiple switching fabrics. In order to optimize the transfer of data across the switch, each switching fabric must communicate with each other in order to determine an optimal path from a storage device to a requesting host. For example, multiple switching fabrics connected to a desired storage cluster may receive a request from a host. The load placed on the switching fabrics may only be internally balanced within each switching fabric or may be inefficiently balanced across multiple fabrics. As a result, retrieved data from a storage device may travel along a non-optimal path to a server.

Independent switching fabrics may also limit the ability to develop fabric services that span multiple logically related switching fabrics. In order to support a storage allocation services spanning a common set of storage clusters connected to a common set of switching fabrics you would need to be able to communicate/view a common set of storage cluster resources and associated bookkeeping.

Therefore, there is a need for a system and method for managing multiple switching fabrics as a single network while still maintaining a physical isolation between each switching fabric during operation.

SUMMARY OF THE INVENTION

The present invention overcomes the deficiencies and limitations of the prior art by providing a system for managing multiple switching fabrics as a single switching network while maintaining a physical isolation between each of the fabrics. In particular, the present invention provides an adjunct processor controlled inter-fabric service link (IFSL) coupled to at least two independent SAN switching networks.

The inter-fabric service link typically operates within a storage area network comprising hosts, switching fabrics and storage devices. However, the present invention is not limited to storage area networks; rather, it may be applied to various types of networks wherein multiple switching fabrics are implemented. Generally, multiple hosts are coupled to multiple storage devices using switching fabrics in various configurations (e.g., distributed or networked configuration). These switching fabrics may function according to various protocols including Fibre Channel, SCSI or Ethernet.

The switches create a fabric that allows an attached host to access multiple storage devices via a logical direct connection between the switch and the host. As a result, a host may request and receive data from various storage devices through the attached switches. Examples of relevant hosts include various types of network servers, mainframes and personal computers. Storage devices within a storage area network are generally storage disks configured in a particular array (e.g. redundant array).

The inter-fabric service link is coupled between multiple switching fabrics to allow the attached switching fabrics to be logically managed as a single entity while still being physically independent of each other. Specifically, the IFSL does not transmit nor receive data being transmitted from a storage device to a host; rather, only management data and service operations are transmitted along the IFSL. The IFSL comprises an inter-fabric adjunct processor, and a plurality of connections to the attached switching fabrics on which the IFSL communicates with IFSL agents operating on various switching elements within the attached switching fabrics.

IFSL agents generate management data and fabric service operations corresponding to the particular switching element on which the agent operates. For example, an IFSL agent will generate management data corresponding to available capacity, device connectivity and performance at each port. This management data is intermittently transmitted to the IFSL for processing. The IFSL agent will also generate fabric service operations, for example, zoning commands, to be forwarded to the other fabric.

Upon receipt of this management data, the IFSL updates a fabric map containing the corresponding switching element according to the received management data. As a result, the IFSL has a current snapshot of the status and functionality of each of the switching elements within the attached switching fabrics. Additionally, the IFSL may respond to the received management data by transmitting operation requests to a switching element. For example, an IFSL may be notified of a failure at a particular switching element. In response, the IFSL may transmit operation requests to various switching elements and/or hosts to re-route data away from the failed switching element. Particularly, data may be routed away from a first switching fabric onto a second switching fabric with a larger capacity to handle the re-routed data. As a result, the IFSL is able to facilitate the cooperation of the multiple switching fabrics while still maintaining a physical separation.

The inter-fabric adjunct processor comprises a processing unit, a plurality of fabric maps, and IFSL services software. Each attached switching fabric will have a corresponding fabric map that contains a topology of the switching elements as well as corresponding characteristics describing the switching elements. This topology and the switching element characteristics are continually updated so as to provide the inter-fabric adjunct processor a current snapshot of each of the attached switching fabrics. The IFSL services software communicates with the IFSL agents in order to respond to various management data received from the agents. Specifically, the IFSL services software contains a protocol and operational algorithm on which the attached switching fabrics are managed.

The operational algorithm provides for various fabric service functions to be performed by the IFSL. For example, fault management, configuration management, accounting, performance management and security management may all be performed by the IFSL. Moreover, this management is coordinated between switching fabrics so as to optimize the overall performance of the switch.

The features and advantages described in this summary and the following detailed description are not all-inclusive, and particularly, many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structure and devices are shown in block diagram form in order to avoid obscuring the invention. References to numbers without subscripts are understood to reference all instance of subscripts corresponding to the referenced number. Moreover, it should be noted that the language used in this disclosure has been principally selected for readability and instructional purposes, and may not have been selected to delineate or circumscribe the inventive subject matter, resort to the claims being necessary to determine such inventive subject matter.

A. Overview of Inter-Fabric Service Link

The present invention provides a service or management device that logically enables managing multiple switching fabrics as a single entity while maintaining a physical separation between the switching fabrics. Typically, these switching fabrics operate within a network (e.g., storage area network and local area network). This service device creates a link between multiple switching fabrics that is controlled by an attached adjunct processor. This link coordinates services functions between the switching fabrics in order to optimize the overall performance of the network in which they operate.

Figure 1:
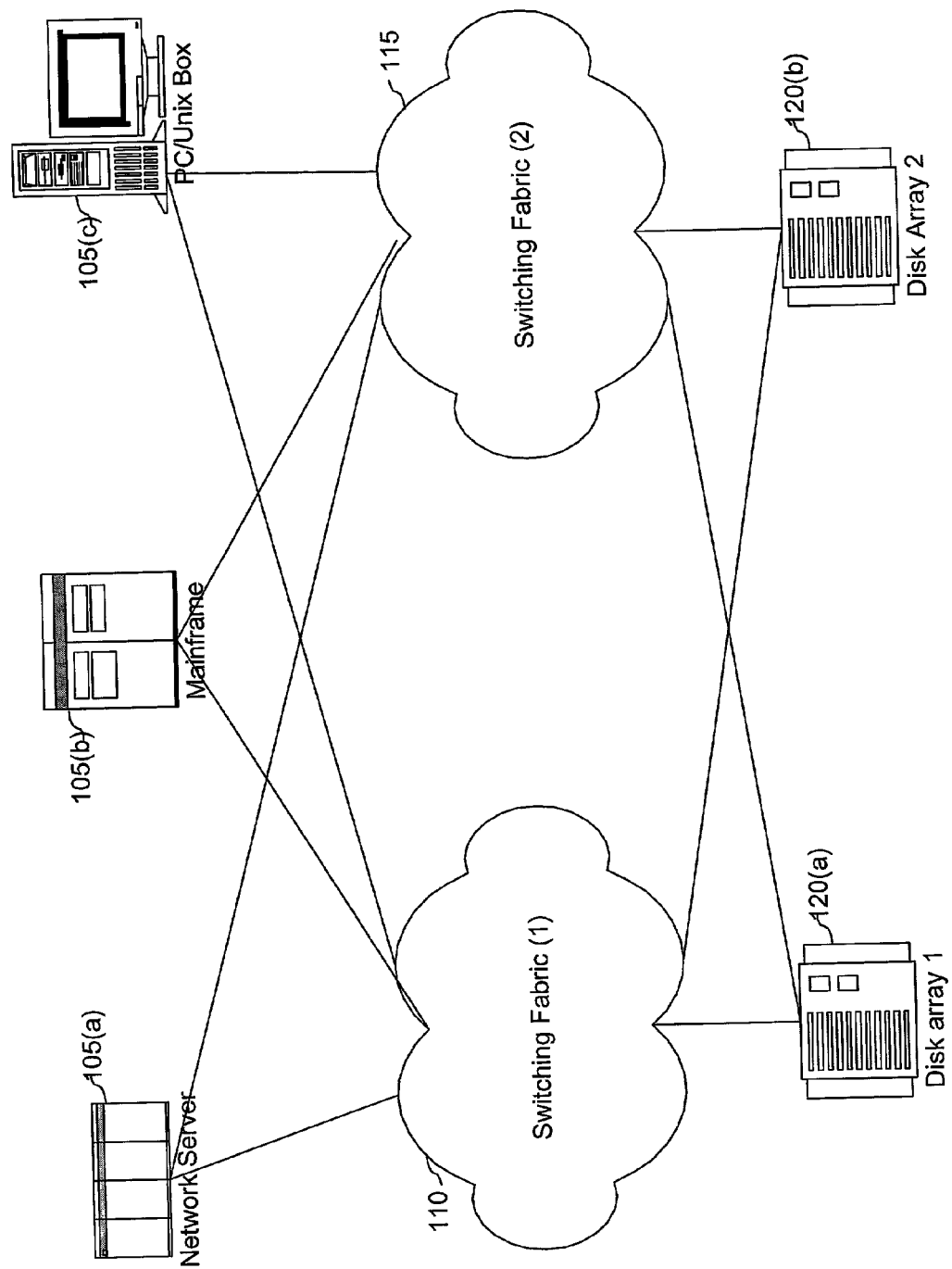
FIG. 1 illustrates a storage area network containing first and second switching fabrics according to the prior art.

FIG. 1 shows an exemplary prior art storage area network (SAN). Generally, multiple hosts 105 are attached to a plurality of storage devices 120 via switching fabrics. In this example, a first switching fabric 110 and second switching fabric 115 connect the hosts 105 to the storage devices 120. The SAN operates by storing data within the storage devices 120, which is available to the attached hosts 105. A host 105 may retrieve data by requesting it from a corresponding storage device 120. Thereafter, the data is transmitted from the storage device 120 to the requesting host 105 across either the first 110 or second 115 switching fabric.

The plurality of hosts 105 may function as a gateway between a SAN and another network (e.g., local area network), a network server and a user interface to the SAN. Examples of hosts include but are not limited to servers 105(a), mainframes 105(b), and PC/Unix boxes 105(c). These hosts 105 are coupled to the storage devices 120 via a plurality of switching fabrics that comprise a switching device. The coupling may function within a variety of networks including, but not limited to, distributed SANs (channel attached) and network area storage (network attached). A distributed SAN couples a plurality of decentralized storage devices to a switch containing multiple switching fabrics. The switches may operate in a variety of different protocols including Fibre Channel and SCSI. Comparatively, network area storage (NAS) couples a plurality of centralized storage devices to a hub or switch containing multiple switching fabrics. Like the channel attached switch, this hub or switch may operate in a variety of different protocols including Ethernet and Internet Protocol (IP).

Both the channel attached and network attached switches allow a large number of hosts 105 to access multiple storage devices 120. As described above, these switches comprise a plurality of independent switching fabrics. As shown in FIG. 1, a first switching fabric 110 functions independently of a second switching fabric 115. This independency of switching fabrics provides a level of redundancy as well as allowing for easy scalability of the switch. However, as discussed in the background, the independent switching fabrics limit the management efficiency of the overall switch.

Figure 2:
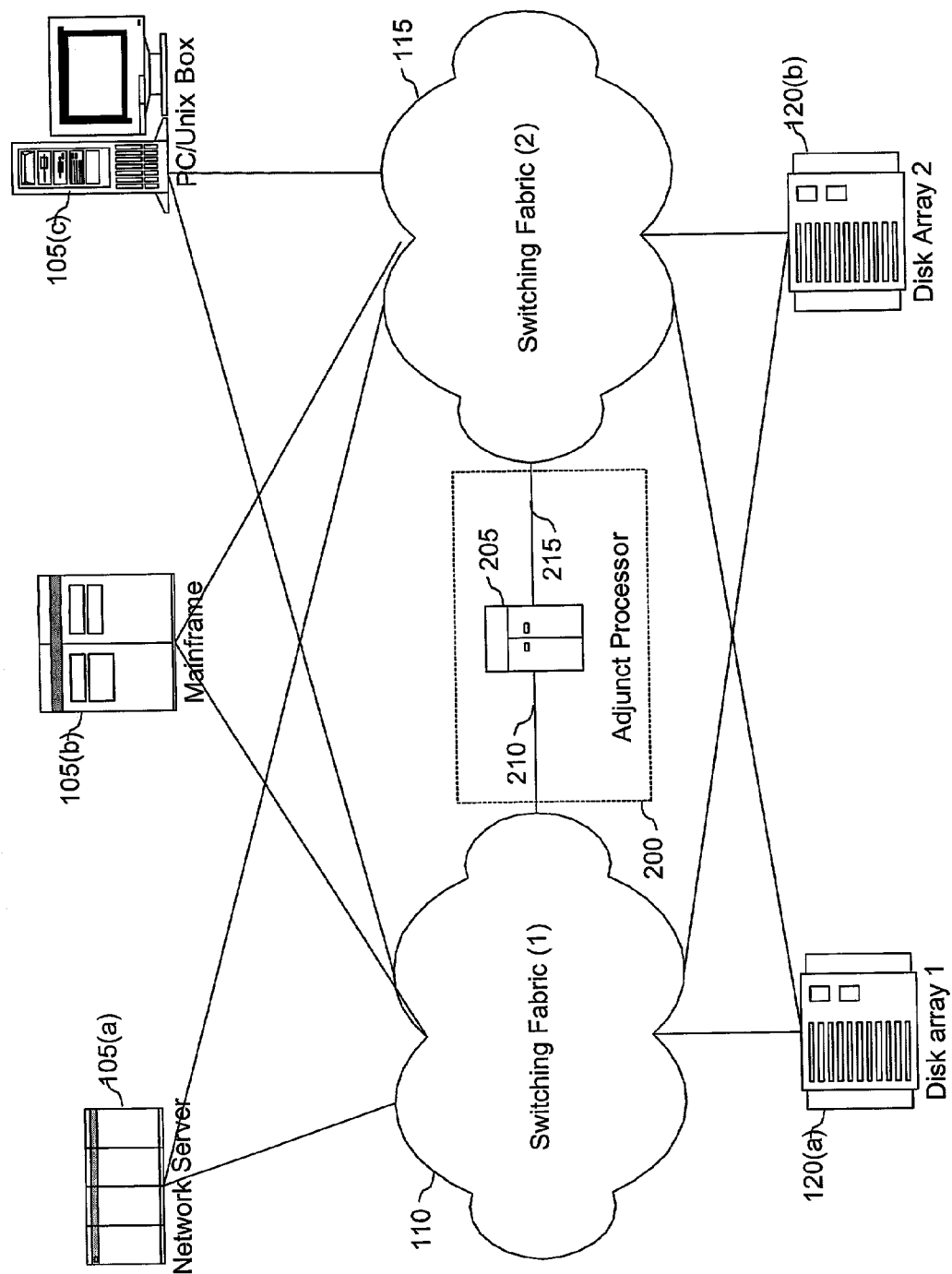
FIG. 2 illustrates an inter-fabric service link coupled between the first and second switching fabrics.

FIG. 2 shows an inter-fabric service link 200 according to the present invention between the first 110 and second 115 switching fabrics. The inter-fabric service link 200 comprises an adjunct processor 205 coupled to the first switching fabric 110 via connection 210 and the second switching fabric 115 via connection 215. These buses may be a native Fibre Channel connection to the switches in both fabrics. The inter-fabric service link 200 coordinates the services of the first switching fabric 110 and the second switching fabric 115. Specifically, the inter-fabric service link 200 performs service functions on both the system and element level of the switching fabrics 110 and 115. It is important to note that the present invention is not limited to functioning between two switching fabrics, but rather be coupled between and provide service functions to many different switching fabrics within a network.

Management data may originate from two sources. First, events within a fabric may generate service data (e.g., a switch fails). Second, an event outside the fabric may generate service data (e.g., a command issued by an operator or a port fails on a storage device or host). The following discussion describes examples of these services functions of switching fabrics.

A first services function provided by the inter-fabric service link 200 is fault management. Fault management occurs on both an element and system level. Generally, fault management includes the detection, isolation and correction of problems occurring in a switching fabric. According to an embodiment of the present invention, the adjunct processor 205 polls or receives an asynchronous notification from each attached network to determine the status of each element in the attached networks. If an error is identified (e.g., failed port on a switch), then the application will route data away from the malfunctioning port. Thereafter, a message is generated to a network administrator relaying the identified problem on the network so that it can be fixed.

A second services function provided by the inter-fabric service link 200 is configuration management. Configuration management occurs on a system level in the attached switching fabrics. Generally, configuration management includes monitoring and maintaining the topology of a switching fabric by identifying changes, additions and deletions to the switching fabric. This topology may be statically maintained by a network administrator or dynamically updated by polling a network and identifying elements therein. For example, a network administrator may expand the first switching fabric 110 by adding another switch that couples a new host and new storage device to the switching fabric. This addition may be identified in the inter-fabric service link 200 by having the adjunct processor 205 be notified by agents in the first switching fabric 110 and identify new elements. The fabrics may detect the addition of a new switch by an agent operating on the new switch transmitting data to the adjunct processor. Another method may be that this identification may be accomplished by comparing the results of the poll to a previously stored topology table of the first switching fabric 110. As a result, management decisions by the inter-fabric service link 200 are based on accurate representations of the switching fabric 110.

A third services function provided by the inter-fabric service link 200 is performance management. Performance management typically occurs on a system level in the attached switching fabrics. Performance management typically includes monitoring the utilization of elements in the switching fabric and adjusting the switching fabric to optimize element utilization. For example, the inter-fabric service link 200 may identify a bottleneck in the first switching fabric 110 at a particular switching element. In response to this identification, the inter-fabric service link may re-balance the load away from the bottleneck across multiple switching fabrics or solely across other switching elements in the first switching fabric 110. As a result of this process, the overall performance of the switching fabrics is optimized by minimizing the effects of bottlenecks occurring at a particular switching element.

A fourth services function provided by the inter-fabric service link 200 is security management. An example in this space is the actual mechanics of managing access rules between servers and storage in an environment that support multiple independent paths between the servers and the storage. In today's SAN environment, a 'Zoning' command to define this access control has to be executed on each of the fabrics supporting the server to storage connectivity. With the IFSL this command need only be executed once by the system administrator.

A fifth services function provided by the inter-fabric service link 200 is cost management. Generally, switching fabric cost management is performed on a system level. Cost management addresses the reliability, operability and maintainability of the attached switching fabrics. Basically, cost management records the performance of the switching fabric and/or identifies changes that might improve the switching fabric. For example, the inter-fabric service link 200 may monitor the mean time between failure or mean time to repair a particular switching fabric. From this data, costs of maintaining the switching fabric as currently implemented versus costs of upgrading the switching fabric may be compared.

A sixth services function provided by the inter-fabric service link 200 is to enable services that facilitate the overall operation of the SAN. An example of such a service is the creation of a storage allocation facility that keeps track of all the allocations associated with all the storage clusters.

The above list of services functions that may be performed by the inter-fabric service link is not meant to be inclusive. Rather, one skilled in the art will recognize that a large number of different services functions exist.

2. Inter-Fabric Service Link Implementations

Figure 3A:
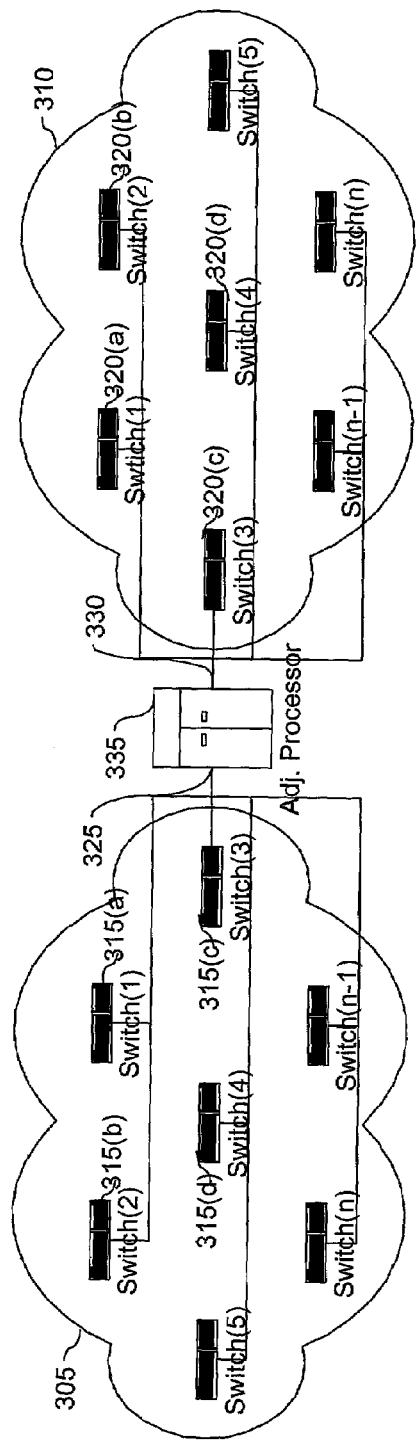
FIG. 3A illustrates a first embodiment of the present invention whereby the inter-fabric service link is directly coupled to multiple elements within the first and second switching fabrics.

FIG. 3A shows a first implementation of the present invention whereby an adjunct processor 335 is directly coupled to each element in the attached switching fabrics within a storage area network. A first switching network 305 comprises N number of switching elements 315. An inter-fabric service link comprises an adjunct processor 335, a first connection 325 and a second connection 330. The first connection 325 is coupled directly to each switch 315 in the first switching fabric 305. Specifically, the first connection 325 directly couples the adjunct processor 335 to switch(1) 315(a), switch(2) 315(b) . . . switch(n). A second attached switching fabric 310 comprises N number of switching elements 320. The adjunct processor 335 is directly connected, via the second connection 330, to each of the switching elements 320 in the second switching fabric 310 in the same manner as the first switching fabric 305. The first and second connections 325, 330 can readily be LAN connections, as many switches contain LAN ports for access to services functions.

This first implementation of the present invention provides an inter-fabric management system that does not use any of the bandwidth in the first 305 or second 310 switching fabrics by using out-of-band connections. Specifically, management data is transferred directly from each switching element to the adjunct processor 335, thereby allowing transmitted data to fully utilize paths between the switching elements. However, the first implementation is more complex due to the need to coupling the inter-fabric service link to every switching element in an attached switching fabric, even if such a link is over a LAN, as additional wiring and hubs/switches must be provided.

Figure 3B:
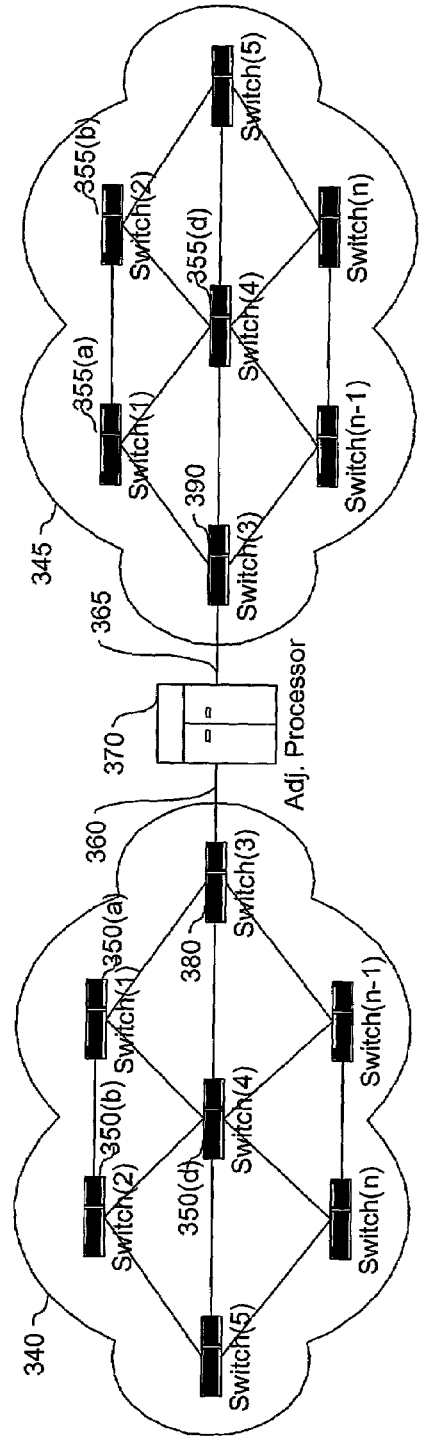
FIG. 3B illustrates a second embodiment of the present invention whereby the inter-fabric service link is directly coupled to a single element in each of the first and second switching fabrics.

FIG. 3B shows a second implementation of the present invention whereby an adjunct processor 370 is directly coupled to a primary switching element in the attached networks. Other secondary switching elements are coupled to the primary switching element via a services channel within the various paths in the attached network. Specifically, a first switching network 340 comprises N number of switching elements 350. An inter-fabric service link comprises an adjunct processor 370, a first connection 360 and a second connection 365. The first connection 360 is directly coupled to a primary switch 380 in the first switching fabric 340. Secondary switches 350 are coupled to the primary switch 380 via services channels within the switching fabric. As a result, management and operations data from the first switching fabric 340 is initially relayed to the primary switch 380 and then transmitted to the adjunct processor 370 via connection 360.

A second attached switching fabric 345 comprises N number of switching elements 355. The adjunct processor 370 is directly connected, via the second connection 365, to a primary switch 390 in the second switching fabric 345. Secondary switches 355 are connected to the primary switch 390 via services channels. Management data is transmitted to the adjunct processor 370 from the second switching fabric 345 in the same manner described above for the first switching fabric 340. The first and second connections 360, 365 can readily be the same type as the connections in the fabrics 340, 345, such as Fibre Channel links.

This second implementation of the present invention provides an inter-fabric services system that requires bandwidth in order to transmit management data from the first 340 or second 345 switching fabrics to the adjunct processor 370. Specifically, management data is transferred from switching elements 350, 355 to the adjunct processor 370 via services channels operating in-band within attached switching fabrics. As a result, the bandwidth available to transmit data between hosts and storage device is reduced. However, the second implementation is easier to install because the inter-fabric service link need only be coupled to a single primary switch within a switching fabric and no additional connections are needed to other switches within the fabric. Additionally, a storage area network is easily scalable because additional switching fabrics need only couple a primary switch to the inter-fabric service link.

Figure 4:
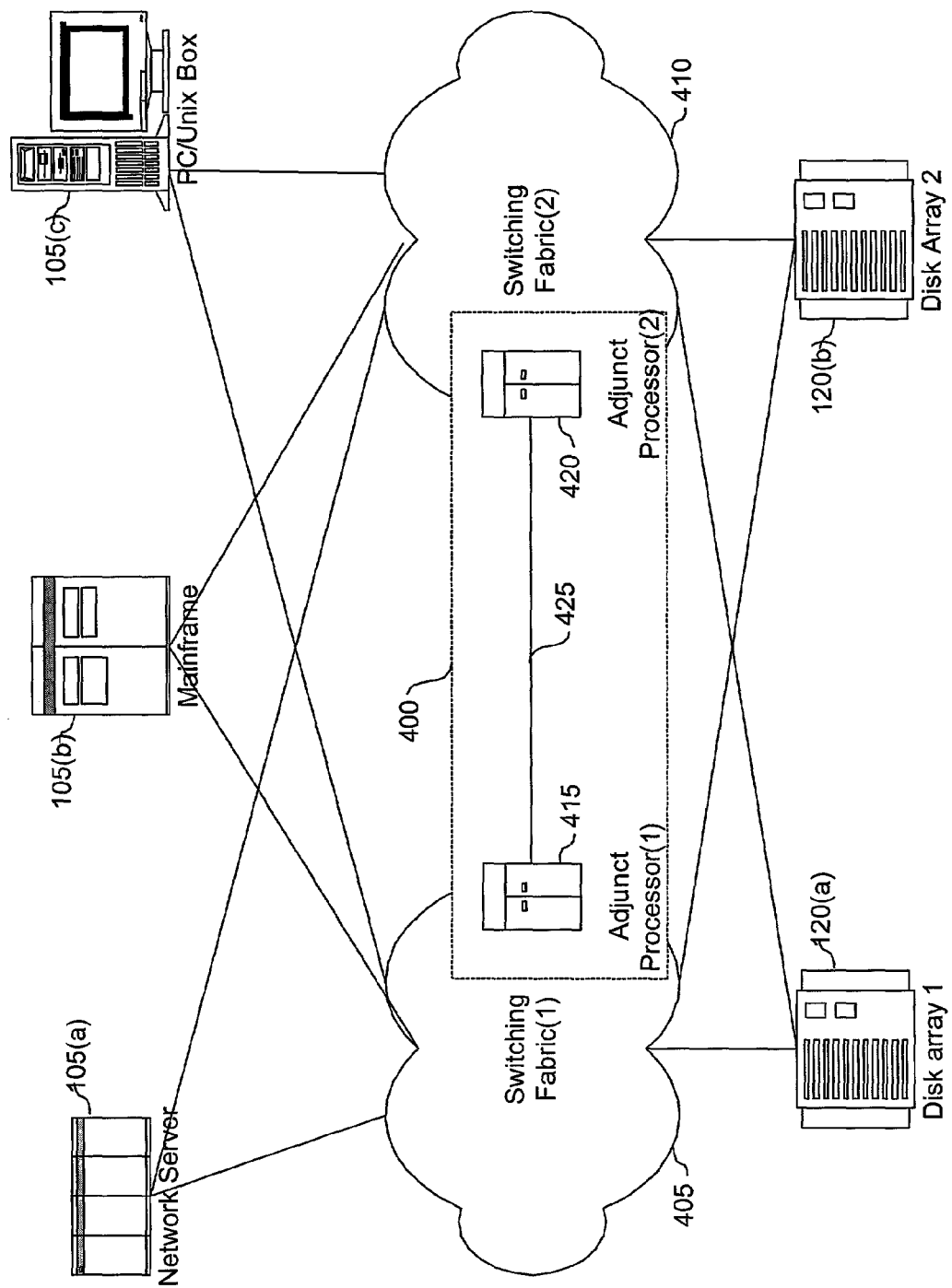
FIG. 4 illustrates a third embodiment of the present invention whereby an adjunct processor controlling the inter-fabric service link resides on an element in either the first or second switching fabrics.

FIG. 4 shows another implementation of the present invention whereby an inter-fabric service link 400 comprises a first adjunct processor 415, a second adjunct processor 420 and a connection 425. The first adjunct processor 415 operates on a primary switch within the first switching fabric 405. The adjunct processor 415 can be the embedded processor operating the primary switch or may be a separate processor located in the primary switch, which communicates with other elements in the switch. Management data is gathered at each switching element in the first switching fabric 405 and transmitted to the primary switch via services channels over in-band links. Thereafter, the first adjunct processor 415 analyzes this management data and reacts accordingly. The second adjunct processor 420 operates on a primary switch within the second switching fabric 410. Management data is gathered at each switching element in the second switching fabric 410 and transmitted to the primary switch via services channels over in-band links. Thereafter, the second adjunct processor 420 analyzes this management data and reacts accordingly.

The first adjunct processor 415 is coupled to the second adjunct processor via connection 425. This connection 425 allows management data to be transmitted between the switching fabrics and allows the processors to create an inter-fabric service link. The connection 425 can be any connection which allows communication between the adjunct processors 415, 420, such as an RS-232 serial link, a LAN segment or any other link. Preferably the connection 425 would not be done using the links of the fabric, as that could compromise the isolated operation of the fabrics 405, 410 or require further changes to the software in the switches to prevent merging the two fabrics. This particular embodiment allows switching fabrics to integrate the adjunct processor within a packaged switching fabric. As a result, switching fabrics need only to couple the primary switches together to create an inter-fabric service link.

C. Detailed Description of Inter-Fabric Service Link

Figure 5:
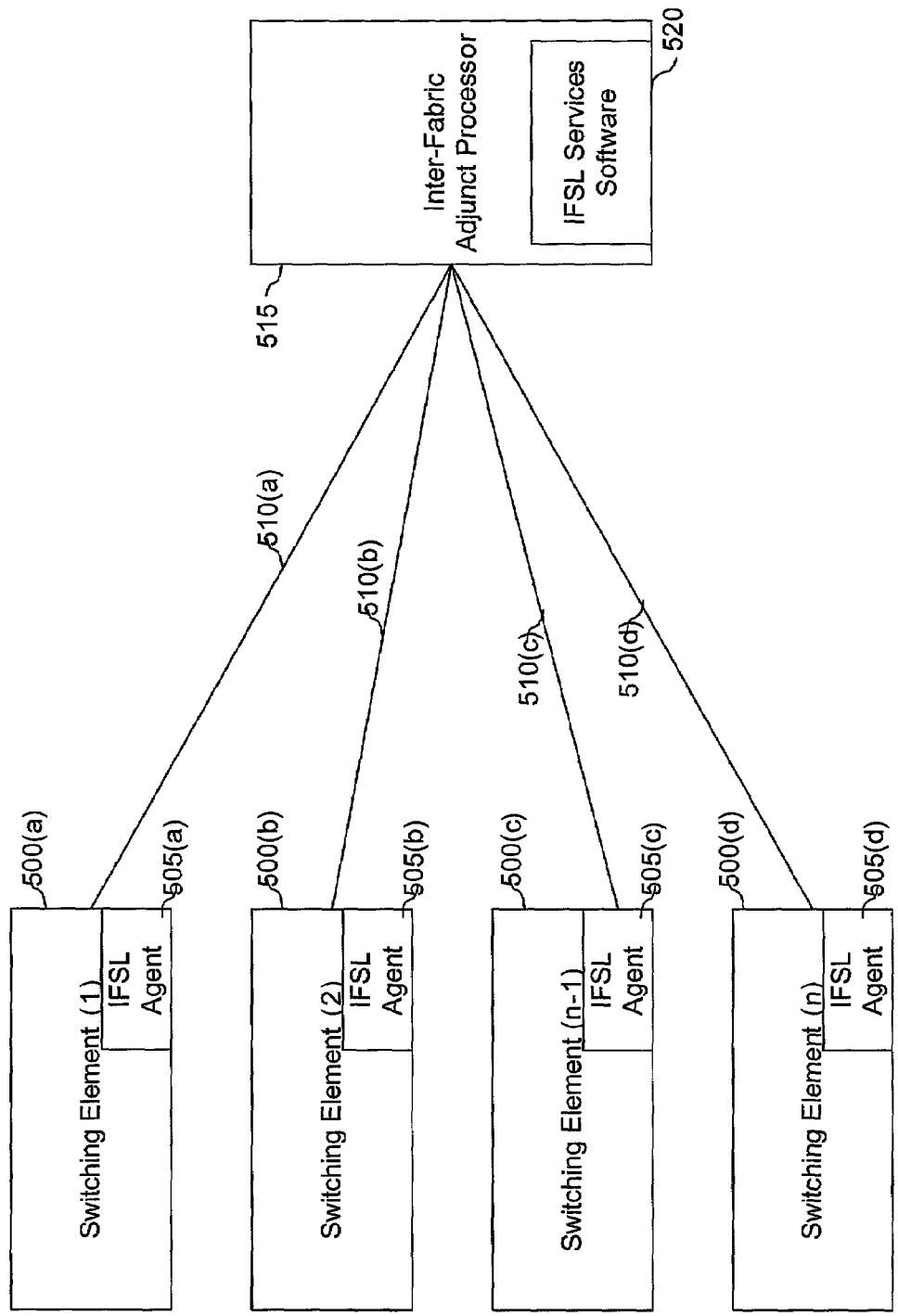
FIG. 5 illustrates a general block diagram of management and agent software operating on the inter-fabric service link.

FIG. 5 shows a general block diagram of software operating on both the inter-fabric adjunct processor 515 and switching elements 500 within a switching fabric. IFSL services software 520 operates on the inter-fabric adjunct processor 515 to receive, analyze and transmit switching fabric management data. The IFSL services software 520 is constantly receiving management data from each of the attached switching fabrics. As a result, this management data may be analyzed in light of other management data from the same switching fabric as well as management data from other switching fabrics within a storage area network.

An IFSL agent 505 generates and transmits management data at each element 500 within a switching fabric. Specifically, the IFSL agent 505 monitors characteristics of a corresponding switching element 500 and reports to the IFSL services software 520. Examples of switching element characteristics include:

(1) whether the switching element is operational (2) available capacity at the switching element and each port (3) physical changes made to a switching fabric (e.g. the addition or removal of switching elements)

(4) connections between switching elements; and (5) current and historical performance of the switching element.

(6) the scope of a command that is sent to the IFSL from the switching element

This management data is transmitted, via connection 510, by the IFSL agent 505 to the IFSL services software 520 where it is analyzed and stored. For example, an IFSL agent 505(a) operating on a first switching element 500(a) monitors the operability of the switching element. At some point in time, the first switching element 500(a) fails in some manner, for example a port or the switch fails. The IFSL agent 505(a) transmits management data describing this failure to IFSL services software 520 via connection 510(a). In response to this management data, the IFSL services software re-routes data around the failed first switching element 500(a) either within the switching fabric or within a different switching fabric. Thereafter, a network administrator is notified of the failure so that the failed first switching element may be repaired or replaced.

As mentioned above, another important function of the IFSL agent 505 is real time monitoring of available capacity on a corresponding switching element. For example, a second IFSL agent 505(b) operating on a second switching element 500(b) monitors the available capacity of each port on the second switching element 500(b) and corresponding management data is transmitted to the IFSL services software 520 via connection 510(b). If a particular port on the second switching element 500(b) becomes increasingly congested, management data containing this information is sent to the IFSL services software 520. The IFSL services software may react by re-balancing the load on the switching fabric containing the second switching element 500(b) or may divert some of the load to a different switching fabric. In either case, the damage (e.g., discarded packets) from port over-congestion is minimized by the IFSL services software 520 and the overall performance of the storage area network is improved.

Figure 6:
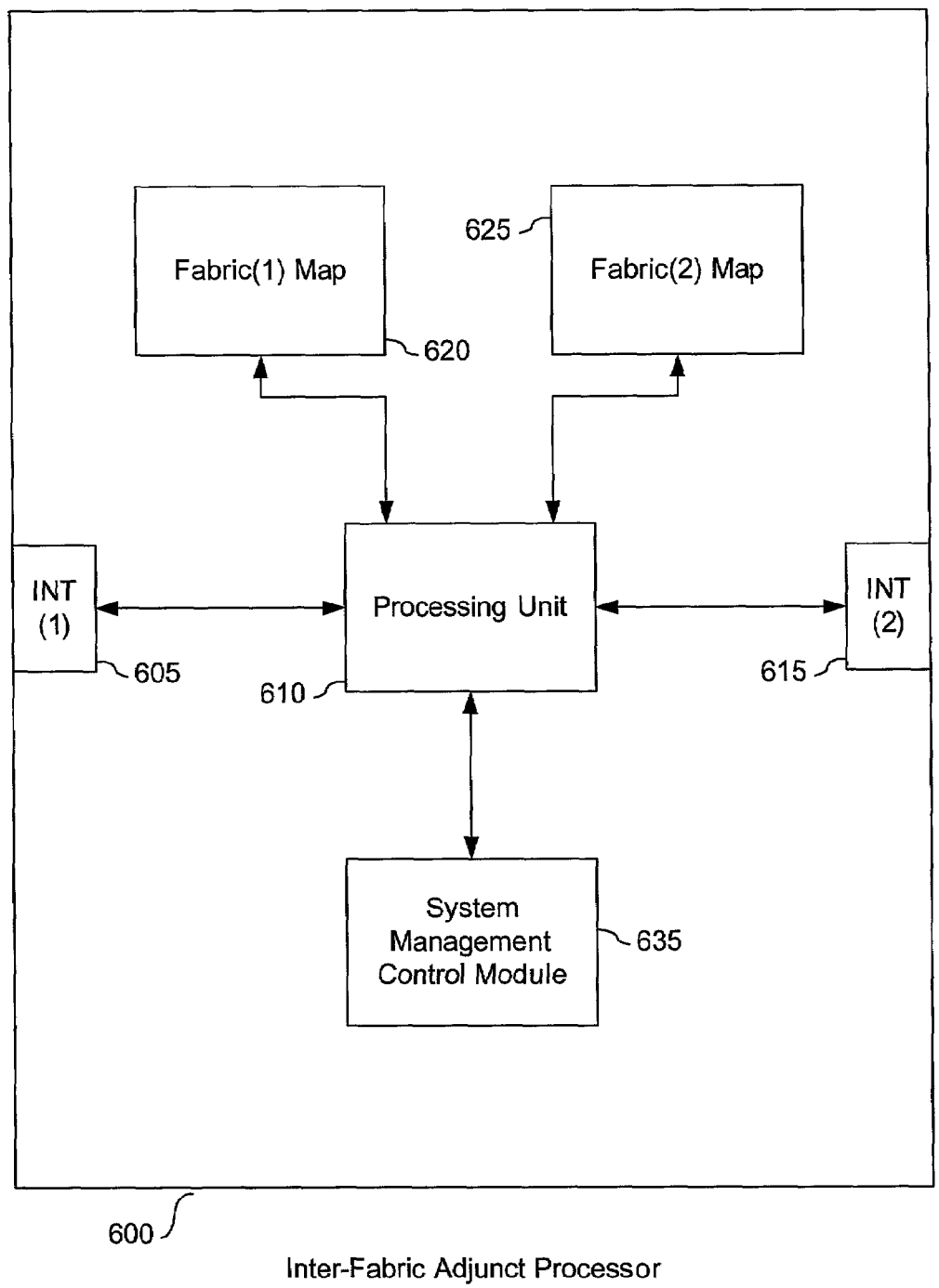
FIG. 6 illustrates a general block diagram of an adjunct processor that controls the inter-fabric service link.

FIG. 6 shows a block diagram of one embodiment of certain elements comprising the inter-fabric adjunct processor 600. The adjunct processor shown in FIG. 2 is connected to two separate switching fabrics. However, it is important to note that the present invention is not limited to interfacing with only two switching fabrics; rather, numerous switching fabrics may be coupled and controlled by the inter-fabric service link.

A processing unit 610 is coupled to a first interface 605 and a second interface 615. The first interface 605 couples the inter-fabric adjunct processor 600 to a first switching fabric. The second interface 615 couples the inter-fabric adjunct processor 600 to a second switching fabric. A fabric map is created for each attached switching fabric. Thus, a first fabric map 620 is coupled to the processing unit 610 and contains a topology of each switching element and corresponding characteristics within the first switching fabric. A second fabric map 625 is coupled to the processing unit 610 and contains a topology of each switching element and corresponding characteristics within the second switching fabric. The first fabric map 620 is continually updated by management data received, via the first interface 605, from elements within the first switching fabric. The second fabric map 625 is continually updated by management data received, via the second interface 615, from elements within the second switching fabric. As a result, a current map of each of the attached switching fabrics is maintained within the inter-fabric adjunct processor.

The processing unit 610 is coupled to a system management control module 635. The system management control module 635 manages the attached switching fabrics on a system level.

The system management control module 635 provides for both switching fabric and storage area network services. Specifically, the system management control module 635 integrates management data from a plurality of switching elements contained in the attached switching fabrics and responds accordingly. For example, the processing unit 610 may receive management data, via the first interface 605, stating that a switching element within the first switching fabric has failed. The system management control module 635 will access the various fabric maps and determine optimized paths on which data may be routed away from the failed switching element. These optimized paths may be solely within the first switching fabric or may be spread among multiple attached switching fabrics. This routing data is then transmitted to the appropriate switching fabrics, hosts and storage devices to implement the re-routing of data accordingly. The system management control module 635 also performs other system level services functions on the attached switching fabrics such as a zoning command being forwarded from a first fabric to a second fabric.

The above description of the inter-fabric adjunct processor is one embodiment of the present invention. The described modules may be combined in various ways to provide the same functionality mentioned above. For example, the network maps 620, 625 may be stored in RAM within the processing unit 610.

Figure 7:
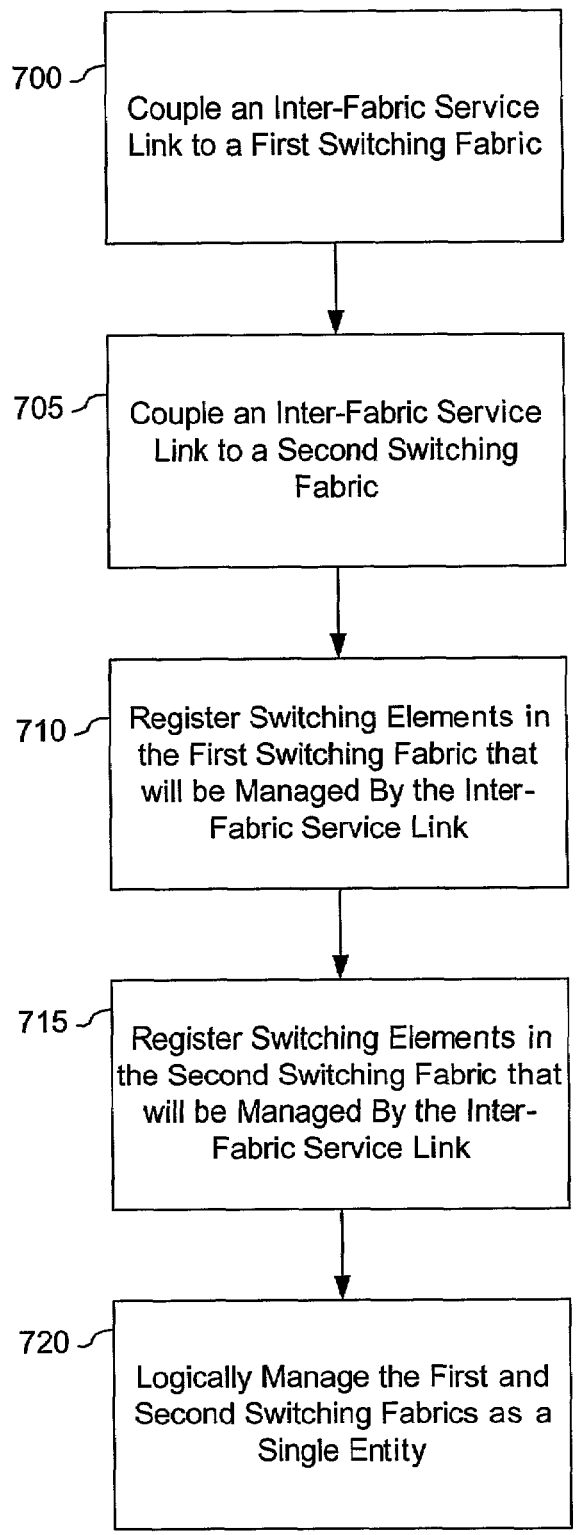
FIG. 7 illustrates a first method for creating an inter-fabric service link between a first and second switching fabric.

FIG. 7 shows a flowchart describing a first method for installing an inter-fabric service link between multiple switching fabrics. Initially, an inter-fabric service link must be physically coupled between multiple switching fabrics. As described above, the inter-fabric service link must be physically coupled 700 to a first switching fabric. Also, the inter-fabric service link must be physically coupled 705 to a second switching fabric. These couplings may be done in various ways including coupling to a primary switching element or directly coupling to each switching element within the switching fabrics.

In addition to physically installing the inter-fabric service link, an initial map of the attached switching fabrics must be generated and stored within the link. A topology of each attached switching fabric must be stored in fabric maps contained in an inter-fabric adjunct processor. Therefore, the switching elements in the first switching fabric are registered 710 in the first fabric map and the switching elements in the second switching fabric are registered 720 in the second fabric map. The registration of switching elements comprises identifying each switching element and generating a corresponding list of characteristics. For example, as mentioned above, switching characteristics include location, security features, performance and connectivity descriptions.

These fabric maps may be initially generated using different methods. A first method has a network administrator manually input the switching element characteristics into the inter-fabric adjunct processor. A second method allows the adjunct processor to poll each attached switching fabric in order to identify switching elements and their corresponding characteristics. For example, the inter-fabric adjunct processor may initially flood an attached switching fabric with a request for switching element characteristics. In response, each switching element would transmit data defining its characteristics. Thereafter, this data would be stored within the inter-fabric adjunct processor.

Once the inter-fabric service link has been physically created and initial fabric maps have been generated, the link would manage 720 the attached fabrics. This management would comprise the management functions discussed above.

Figure 8:
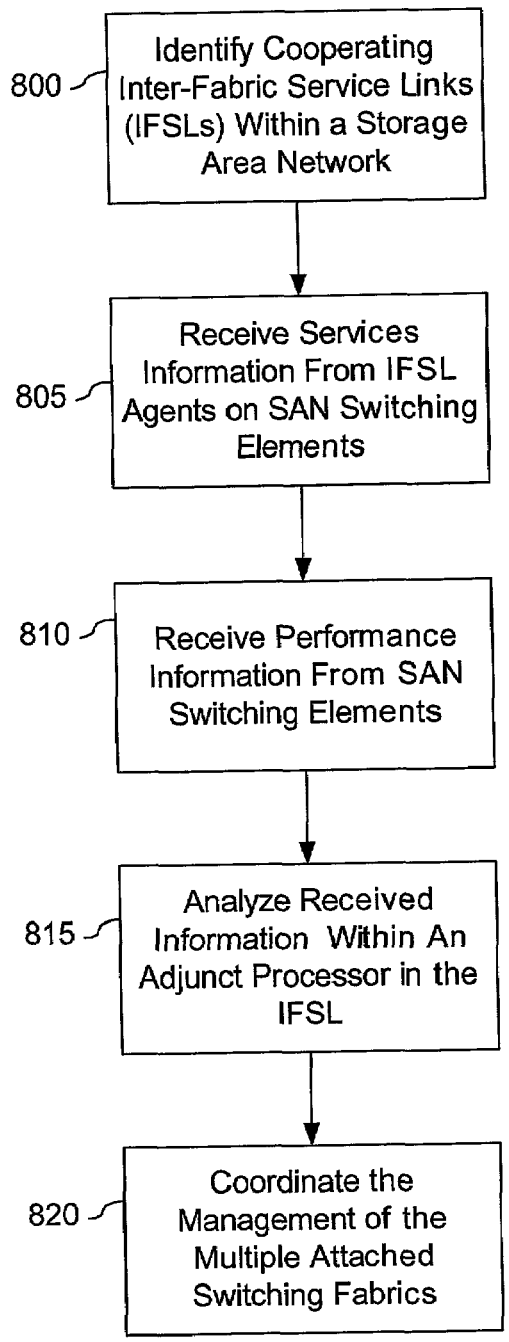
FIG. 8 illustrates a general method for logically managing a first and second switching fabric as a single entity.

FIG. 8 shows a flowchart of a general management method implemented by an inter-fabric service link after the link has been installed and initialized as described above. The link will identify 800 other cooperating IFSLs within the storage area network. This identification will allow management data to be shared between various IFSLs resulting in management cooperation between a large number of switching fabrics in the storage area network.

Management data will be continually transmitted 805 from each IFSL agent on the switching elements to a corresponding IFSL services software on an inter-fabric adjunct processor. As detailed above, the management data describes the status and function of each switching element. For example, available port capacity, security breaches, changes to element connectivity may all be included in the transmitted management data. As a result of this management data, the IFSL has a current snapshot of the switching fabric.

The IFSL will also receive 810 performance information from the switches in the fabrics. The IFSL processes 815 both the management data and performance information in order to efficiently manage each of the attached switching fabric. This management data and performance information allow the IFSL to identify both current and future problems within the switching fabric as well as generate appropriate reactions to these problems. As a result, the IFSL allows the switching fabrics to be logically managed singularly while still maintaining an appropriate physical separation between the switching fabrics.

The IFSL coordinates 820 the management of the attached switching fabrics as discussed above.

Figure 9:
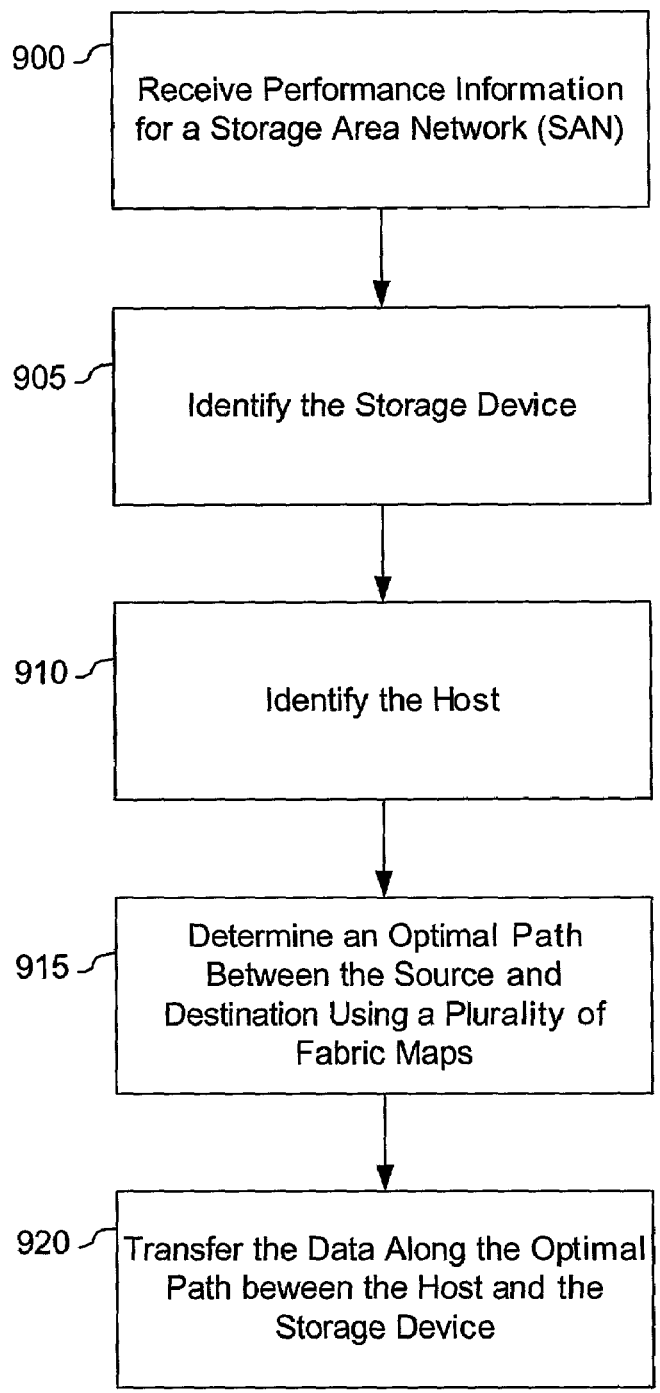
FIG. 9 illustrates a general method for balancing multiple data requests across a storage area network containing multiple switching fabrics.

FIG. 9 shows a flowchart describing a load balancing function that may be performed by the inter-fabric service link. As shown, the IFSL receives 900 performance information from the switches in the storage area network. The performance may relate to traffic between particular devices in the SAN or traffic over particular links. For example, if the performance information relates to traffic between two devices, the IFSL may identify 905 this storage device and may identify 910 the location of the requesting host.

The IFSL determines 915 an optimal path between the identified host and storage device using fabric maps corresponding to switching fabrics coupled to both the identified host and storage device. Specifically, the IFSL will identify a plurality of different possible paths that may connect the storage device to the host. Thereafter, the IFSL will identify an optimal path using fabric maps containing characteristics of the switching elements within these paths. As a result, a path is selected that will likely result in the least amount of delay between the storage device and the host as well as placing a minimized amount of strain on the actual switching fabric. The path selection is a binary decision to command a host to use a first fabric or a second fabric. In other words, if the IFSL determines that a switch failure is causing a host to cross more hops within a fabric to get to a storage device, the IFSL may instruct the host to use a fabric where the number of hops may be minimized.

Data is transferred 920 along this optimized path from the storage device to the host. This optimized path may be used to transmit the entire file or the path may be dynamically altered by the IFSL as the environment within the switching fabric changes.

While FIGS. 2, 3A, 3B, and 4 have illustrated a single inter-fabric service link, it is understood that this link could also be duplicated to provide a redundant inter-fabric service link. For example, with reference to FIG. 2, a second adjunct processor connected to each switching fabric 110 and 115 could be provided. A connection would be provided between the adjunct processor 205 and this second adjunct process to allow coordination and failover between the adjunct processors. Each adjunct processor would have coordination or failover software to manage these tasks.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A storage area network inter-fabric services device for use with first and second independent switching fabrics, each independent switching fabric including at least one switching element, the inter-fabric services device comprising:

a first interface for transmitting and receiving fabric management data from the first independent switching fabric;

a second interface for transmitting and receiving fabric management data from the second independent switching fabric; and an inter-fabric adjunct processor coupled to a said first interface and said second interface, said inter-fabric adjunct processor for analyzing and responding to fabric management data from the first and second independent switching fabrics, said inter-fabric adjunct processor including:
   a processing unit for analyzing the fabric management data from the first and second independent switching fabrics; and
   a system management control module coupled to said processing unit, said system management control module for managing, on a system level, at least one of the first and second switching fabrics.

2. The inter-fabric services device of claim 1, wherein said inter-fabric adjunct processor includes:
   a first fabric map coupled to said processing unit, said first fabric map containing a topology and characteristics for at least one switching element in the first switching fabric; and
   a second fabric map coupled to said processing unit, said second fabric map containing a topology and characteristics for at least one switching element in the second switching fabric.

3. The inter-fabric services device of claim 2, wherein said first and second fabric maps are dynamically updated by said processing unit polling the first and second switching fabrics.

4. The inter-fabric services device of claim 1, wherein the first and second switching fabrics operate in a Fibre Channel storage area network.

5. The inter-fabric services device of claim 1, wherein each of said first and second interfaces are either in-band or out-of-band.

6. A storage area network inter-fabric services device for use with first and second independent switching fabrics, each independent switching fabric including at least one switching element, the inter-fabric services device comprising:
   a first interface for transmitting and receiving fabric management data from the first independent switching fabric;
   a second interface for transmitting and receiving fabric management data from the second independent switching fabric; and
   an inter-fabric adjunct processor coupled to a said first interface and said second interface, said inter-fabric adjunct processor for analyzing and responding to fabric management data from the first and second independent switching fabrics, said inter-fabric adjunct processor including:
      a first embedded adjunct processor located in a switching element in the first independent switching fabric;
      a second embedded adjunct processor located in a switching element in the second independent switching fabric; and
      an interconnection link between said first and second embedded adjunct processors.

7. The inter-fabric services device of claim 6, wherein said first and second interfaces are in-band and said interconnection link is out-of-band.

8. A system for logically coupling a first independent switching fabric and a second independent switching fabric, each independent switching fabric including at least one switching element, the system comprising:
   an inter-fabric services device coupled to the first independent switching fabric and the second independent switching fabric, said inter-fabric services device for logically managing the first and second independent switching fabrics as a single entity;
   a first inter-fabric services agent coupled to said inter-fabric services device and operating on a first switching element in the first switching fabric, said first inter-fabric services agent for communication with said inter-fabric services device; and
   a second inter-fabric services agent coupled to said inter-fabric services device and operating on a second switching element in the second switching fabric, said second inter-fabric services agent for communication with said inter-fabric services device, said inter-fabric services device including:
      a first interface for transmitting and receiving fabric management data from the first independent switching fabric;
      a second interface for transmitting and receiving fabric management data from the second independent switching fabric; and
      an inter-fabric adjunct processor coupled to said first interface and said second interface, said inter-fabric adjunct processor for analyzing and responding to fabric management data from the first and second independent switching fabrics, said inter-fabric adjunct processor including:
         a processing unit for analyzing the fabric management data from the first and second switching fabrics; and
         a system management control module coupled to said processing unit, said system management control module for managing, on a system level, at least one of the first and second switching fabrics.

9. The system of claim 8, wherein said inter-fabric adjunct processor includes:
   a first fabric map coupled to said processing unit, said first fabric map containing a topology and characteristics for at least one switching element in the first switching fabric; and
   a second fabric map coupled to said processing unit, said second fabric map containing a topology and characteristics for at least one switching element in the second switching fabric.

10. The system of claim 9, wherein said first and second fabric maps are dynamically updated by said processing unit polling the first and second switching fabrics.

11. The system of claim 8, wherein each of said first and second interfaces are either in-band or out-of-band.

12. A system for logically coupling a first independent switching fabric and a second independent switching fabric, each independent switching fabric including at least one switching element, the system comprising:
   an inter-fabric services device coupled to the first independent switching fabric and the second independent switching fabric, said inter-fabric services device for logically managing the first and second independent switching fabrics as a single entity;
   a first inter-fabric services agent coupled to said inter-fabric services device and operating on a first switching element in the first switching fabric, said first inter-fabric services agent for communication with said inter-fabric services device; and
   a second inter-fabric services agent coupled to said inter-fabric services device and operating on a second switching element in the second switching fabric, said second inter-fabric services agent for communication with said inter-fabric services device, said inter-fabric services device including:

a first interface for transmitting and receiving fabric management data from the first independent switching fabric;

a second interface for transmitting and receiving fabric management data from the second independent switching fabric; and an inter-fabric adjunct processor coupled to said first interface and said second interface, said inter-fabric adjunct processor for analyzing and responding to fabric management data from the first and second independent switching fabrics, said inter-fabric adjunct processor including:

a first embedded adjunct processor located in a switching element in the first independent switching fabric;

a second embedded adjunct processor located in a switching element in the second independent switching fabric; and an interconnection link between said first and second embedded adjunct processors.

13. The system of claim 12, wherein said first and second interfaces are in-band and said interconnection link is out-of-band.

14. An inter-fabric services device for use with first and second independent switching fabrics, each independent switching fabric including at least one switching device, the inter-fabric services device comprising:

means for receiving and transmitting fabric management data between the first switching fabric and an inter-fabric service link;

means for receiving and transmitting fabric management data between a second switching fabric and the inter-fabric service link;

means for processing the fabric management data from the first and second switching fabrics;

means for coordinating the management of the first and second switching fabrics; and system management control means for managing, on a system level, at least one of the first and second switching fabrics.

15. The inter-fabric services device of claim 14, said inter-fabric service link including:

means for generating a first fabric map, said first fabric map containing a topology and characteristics for at least one element in the first switching fabric; and means for generating a second fabric map, said second fabric map containing a topology and characteristics for at least one element in the second switching fabric.

16. The inter-fabric services device of claim 15, wherein the generating means for the first and second switching fabric maps includes means for polling the first and second switching fabrics.

17. The inter-fabric services device of claim 14, wherein the first and second switching fabrics operate in a Fibre Channel storage area network.

18. A storage area network comprising:

a first independent switching fabric including at least one switching element;

a second independent switching fabric including at least one switching element;

a first interface for transmitting and receiving fabric management data from said first independent switching fabric;

a second interface for transmitting and receiving fabric management data from said second independent switching fabric; and an inter-fabric adjunct processor coupled to a said first interface and said second interface, said inter-fabric adjunct processor for analyzing and responding to fabric management data from said first and second independent switching fabrics, said inter-fabric adjunct processor including:

a processing unit for analyzing the fabric management data from said first and second independent switching fabrics; and a system management control module coupled to said processing unit, said system management control module for managing, on a system level, at least one of said first and second switching fabrics.

19. The storage area network of claim 18, wherein said inter-fabric adjunct processor includes:

a first fabric map coupled to said processing unit, said first fabric map containing a topology and characteristics for at least one switching element in said first switching fabric; and a second fabric map coupled to said processing unit, said second fabric map containing a topology and characteristics for at least one switching element in said second switching fabric.

20. The storage area network of claim 19, wherein said first and second fabric maps are dynamically updated by said processing unit polling said first and second switching fabrics.

21. The storage area network of claim 18, wherein said first and second switching fabrics operate in a Fibre Channel storage area network.

22. The storage area network of claim 18, wherein each of said first and second interfaces are either in-band or out-of-band.

23. A storage area network comprising:

a first independent switching fabric including at least one switching element;

a second independent switching fabric including at least one switching element;

a first interface for transmitting and receiving fabric management data from said first independent switching fabric;

a second interface for transmitting and receiving fabric management data from said second independent switching fabric; and an inter-fabric adjunct processor coupled to a said first interface and said second interface, said inter-fabric adjunct processor for analyzing and responding to fabric management data from said first and second independent switching fabrics, said inter-fabric adjunct processor including:

a first embedded adjunct processor located in a switching element in said first independent switching fabric;

a second embedded adjunct processor located in a switching element in said second independent switching fabric; and an interconnection link between said first and second embedded adjunct processors.

24. The storage area network of claim 23, wherein said first and second interfaces are in-band and said interconnection link is out-of-band.

* * * * *